UNITED STATES PATENT OFFICE.

PROSPER CABRIÉ, OF NEW YORK, N. Y.

MANUFACTURE OF ARTIFICIAL STONE.

SPECIFICATION forming part of Letters Patent No. 677,853, dated July 9, 1901.

Application filed October 23, 1900. Serial No. 34,056. (No specimens.)

*To all whom it may concern:*

Be it known that I, PROSPER CABRIÉ, a citizen of France, residing at New York city, in the county of New York and State of New York, have invented certain new and useful Improvements in the Manufacture of Artificial Stone, of which the following is a specification.

This invention relates to the manufacture of artificial stone suitable for building materials and moldings used in the interior of buildings, said material possessing great strength and hardness and having a light-cream color of pleasing appearance, which will not require any painting of the surface; and it consists of the combination of ingredients, as will be hereinafter particularly described, and specifically set forth in the claim.

The composition of materials and their treatment to obtain an artificial stone of light-cream shade for ornamentations and moldings in the interior of buildings at greatly reduced cost is by the union of the following substances in the proportions given, as follows: twenty-five kilos of slaked lime, one hundred kilos of plaster-of-paris, in powder, five kilos of powdered alum, two kilos of yellow ocher, two hundred and fifty grams of lampblack, five hundred grams of red ocher, one hundred and fifty kilos of dry sand. The whole well mixed in a dry state can be placed in barrels and closed to exclude dampness, or it may be used immediately after the mixture has been made.

The treatment of the above composition to obtain moldings of artificial stone is as follows: Said composition is dumped on a floor or in a suitable trough and water is added and mixed with it to produce the proper consistency, as commonly done with cements, and a portion of it is poured and evenly distributed into molds. Said molds may be of plaster-of-paris or of gelatin, the latter being preferred for its economy, as the composition sets rapidly in ten or twelve minutes. The reproduction is thus obtained and the mold is removed without any material injury or wear to said mold. Within a few hours after the artificial stone has been molded, and thus preferably while it is still damp, its smooth-appearing surface may be easily removed by rubbing it with the tools commonly used by stone-cutters and sculptors, or it may be left smooth, if so desired. After having thus given to the stone its completed form it is left to dry in the shade for ten or twelve days, and is then washed with tepid water containing twenty per cent. of liquid silicate of potash, which completes the treatment.

When the artificial stone is made directly upon the face of the walls, the same materials are used in the proportions above given, following the well-known rules employed in working cement. The face is then roughened, if desired, within a few hours, and ten or twelve days later the face of the stone is washed with tepid water containing twenty per cent. of liquid silicate of potash.

Having now fully described my invention, I claim—

An artificial-stone composition consisting in the combination of dry sand, slaked lime, plaster-of-paris and powdered alum with yellow ocher, red ocher and lampblack in the proportions substantially as set forth.

In testimony whereof I affix my signature in presence of two witnesses.

PROSPER CABRIÉ.

Witnesses:
  E. E. MASSON,
  R. F. STORM.